US007647693B2

(12) United States Patent
Mondrusov et al.

(10) Patent No.: US 7,647,693 B2
(45) Date of Patent: Jan. 19, 2010

(54) VALVE STEM INSTALLATION SYSTEM AND METHOD OF INSTALLING THE VALVE STEM

(75) Inventors: Eugene M. Mondrusov, Novi, MI (US); Ben Giacona, Grosse Pointe Woods, MI (US); Brian Hoy, Brighton, MI (US); Dan Pellerin, Howell, MI (US)

(73) Assignee: Schenck Rotec Corporation, Orion, MI (US)

( * ) Notice: Subject to any disclaimer, the term of this patent is extended or adjusted under 35 U.S.C. 154(b) by 0 days.

(21) Appl. No.: 11/547,341

(22) PCT Filed: Mar. 31, 2005

(86) PCT No.: PCT/US2005/010625
§ 371 (c)(1),
(2), (4) Date: Aug. 15, 2008

(87) PCT Pub. No.: WO2005/097401
PCT Pub. Date: Oct. 20, 2005

(65) Prior Publication Data
US 2008/0301923 A1 Dec. 11, 2008

Related U.S. Application Data

(63) Continuation-in-part of application No. 10/740,296, filed on Dec. 18, 2003, now Pat. No. 7,181,832.

(60) Provisional application No. 60/453,262, filed on Mar. 10, 2003, provisional application No. 60/558,185, filed on Mar. 31, 2004.

(51) Int. Cl.
*B23P 21/00* (2006.01)
*B23P 19/10* (2006.01)

(52) U.S. Cl. ............... 29/714; 29/717; 29/221.5; 29/894.351; 73/146.8

(58) Field of Classification Search .......... 29/714, 29/717, 720, 407.04, 407.09, 407.1, 221.5, 29/890.123, 894.3, 894.35, 894.351; 73/146.8
See application file for complete search history.

(56) References Cited

U.S. PATENT DOCUMENTS 6,026,552 A * 2/2000 Matsumoto .............. 29/407.04
6,481,083 B1 * 11/2002 Lawson et al. ........... 29/407.04

* cited by examiner

*Primary Examiner*—David P Bryant
*Assistant Examiner*—Sarang Afzali
(74) *Attorney, Agent, or Firm*—Howard & Howard Attorneys PLLC

(57) ABSTRACT

A valve stem installation system (10) includes a conveyor (24) for moving wheel rims (14). A detector (50) is comparable with the conveyor (24) to detect size of the wheel rim (14) and a location of an aperture (12) of the wheel rim (14) to receive various valve stems (16, 18). Two robots (110, 112) are adaptable for matably moving the valve stem (16, 18) to the wheel rim (14). A controller (60) is operably communicated with the robots (110, 112) and the detector (50) for receiving a signal from the detector (50) as the detector (50) identifies configuration of the wheel rim (14) and then transmitting the signal to the robots (110, 112) thereby directing the robots (110, 112) to selectively engage the valve stem (16, 18) to be inserted into the aperture (12). An insertion tool (114) is connected to each robot (110, 112) to selectively engage the valve stem (16, 18) to interchangeably move and insert the valve stem (16, 18) into the aperture (12) in response to the signal received by the robot (110, 112) from the controller (60).

34 Claims, 7 Drawing Sheets

VALVE STEM INSTALLATION SYSTEM AND METHOD OF INSTALLING THE VALVE STEM

RELATED APPLICATIONS

This is a continuation in part application that claims the benefit of the nonprovisional patent application Ser. No. 10/740,296, now U.S. Pat. No. 7,181,832 for a VALVE STEM INSTALLATION DEVICE, filed on Dec. 18, 2003, which claims the benefit of the provisional patent application Ser. No. 60/453,262 for a VALVE STEM INSTALLATION SYSTEM AND METHOD OF INSTALLING VALVE STEM, filed on Mar. 10, 2003, and claims the benefit of the provisional patent application Ser. No. 60/558,185 for a VALVE STEM INSERTION APPARATUS AND METHOD, filed on Mar. 31, 2004, which are hereby incorporated by reference in their entireties.

BACKGROUND OF THE INVENTION

1. Field of the Invention

The subject invention relates to a wheel and tire assembly for an automotive vehicle, and more particularly to an apparatus and method for mounting a valve stem into a wheel rim.

2. Description of the Prior Art

In the assembly of automotive wheel rims and tires, the tire is mounted onto the wheel rim and then inflated. Prior to mounting the tire, a valve stem is inserted into an aperture defined in the wheel rim to permit inflation of the tire. For manufacturing wheel rims on a large production scale, machines are used to automatically insert the valve stems into the wheel rims. Because the wheel rims of different sizes require differently sized valve stems, valve stemming machines must either operate on the wheel rims of a single size or be able to accommodate the use of several sizes of the valve stems.

Over the last few years, snap-in valve stems have become very popular in the automotive industry due to their ease of installation method. Clamp-in tire pressure monitoring systems type of a valve stem (the TPM) are similar to the snap-in valve stems, but also include a tire pressure monitor affixed to one end of the TPM. In order to install the TPM on the wheel rim, the TPM is placed through an opening defined in the wheel rim and then secured to the wheel rim by a retention nut over the TPM. A valve cap is then screwed onto the TPM to form an airtight seal and prevent dust and dirt from entering the valve.

Generally, as done in the past, mounting the valve stem into the wheel rim of any kind, have been performed manually. In particular, mounting the valve stem into the wheel rim has been performed by a stem-inserting tool. Such manual processes are expensive because of the labor and time involved. In addition, operations performed manually are subject to a processing error. Several prior art patents disclose processes for mounting the valve stem into the wheel rim. The art is also replete with various systems and methods, which involve a robot that installs the valve stem into the wheel rim. These systems are taught by the U.S. Pat. No. 4,353,156 to Rosaz; U.S. Pat. No. 5,940,960 to Doan et al.; U.S. Pat. No. 6,481,083 to Lawson el al.; and U.S. Pat. No. 6,801,126 to Harm. Other prior art devices utilize a rotatable carousel to dispense valve stems of varying sizes onto a valve stem insertion tool.

The U.S. Pat. No. 6,481,083 to Lawson et al., for example, teaches a valve stem assembly line that includes an input conveyor to supply wheel rim rims, a locator station positioned at the end of the input conveyor, a valve stem mounting station, adjacent the locator station, and an output conveyor for carrying the assembled wheel rim/stem units away. This prior art reference teaches a robotic manipulator to grasp the wheel rim in the locator station and to then move the wheel rim to three separate stem mounting stations each of which is loaded with a different type of valve stem, respectively. As each rim reaches the gauging station, video camera images the rim and the control system identifies it as either a car rim or a truck rim. The control system then directs the robotic manipulator to move the rim to whichever of the mounting stations is loaded with the correct stem for that rim. A nut runner mounted to the robotic manipulator is activated to thread a nut over the end of the valve stem only when a stem requiring such action, such as pressure transducer stem, has been mounted to the rim. The U.S. Pat. No. 6,481,083 to Lawson et al. teaches three separate stem mounting stations each loaded with a different type of valve stem intended for use with different types and/or sizes of wheel rims. The control system directs the robotic manipulator to move the wheel rim to one of the mounting stations.

The assembly line taught by the U.S. Pat. No. 6,481,083 to Lawson et al. is complex, bulky and requires three separate valve stern mourning stations with the robotic manipulator moving the wheel rim to the respective valve stein mounting station. This prior art system diminishes assembly time and flexibility of assembling environment. This system also performs numerous redundant operations, such as moving the wheel rim to different mounting stations which does not reduce time for assembly of the wheel rims and does not offer the flexibility needed in the modern manufacturing environment. Although the prior an valve stem installation systems are widely used in the automotive industry, these prior art designs have proven to be extremely complicated, and therefore non practicable, or have been inflexible in a manufacturing environment, particularly when a variety of valve steins are mated to a variety of the wheel rims.

The opportunity remains for a new design of the valve stem installation system for installation of at least two different valve stems into the wheel rim that will eliminate the need of an extra unit, reduce space in manufacturing environment, and offer the flexibility needed to process multiple sizes of tires.

BRIEF SUMMARY OF INVENTION

An inventive valve stem installation system includes a conveyor for moving wheel rims. A detector is cooperable with the conveyor to detect size of the wheel rim and a location of an aperture defined in the wheel rim to receive a valve stem or a pressure monitoring device (the TPM). At least one robotic device is adaptable for matably moving one of the valve stem and the TPM to the wheel rim. A controller operably communicates with the robotic device and the detector for receiving a signal from the detector as the detector identifies configuration of the wheel rim. The controller then transmits the signal to the robotic device thereby directing the robotic device to selectively engage one of the valve stem and the TPM to be inserted into the aperture. An insertion tool is connected to the robotic device. The insertion tool is adaptable for selectively engaging one of the valve stem and the TPM and interchangeably moving and inserting one of the valve stem and the TPM into the aperture in response to the signal received by the robotic device from the controller.

The subject invention includes a method of selectively engaging the valve stem and the TPM and assembling one of the valve stem and the TPM with the wheel rim having the aperture formed therein. The method includes the steps of identifying size of the wheel rim followed by the step of rotating the robotic device relative to the wheel rim and matably moving one of the valve stem and the TPM to the wheel rim. The following step of the method includes associating the controller with the robotic device to receive a signal as the size of the wheel rim is identified and followed by transmitting the signal to the robotic device to direct the robotic device to selectively engage one of the valve stem and the TPM. The next step of the method includes connecting the insertion tool to the robotic device to selectively engage one of the valve stem and the TPM followed by the step of interchangeably moving and inserting one of the valve stem and the TPM into the aperture in response to the signal received by the robotic device from the controller.

One advantage of the present invention is to provide for an installation of the valve stem into the wheel rim, performed on a single assembly line by multiple robotic devices eliminating the need of redundant operations, such as moving the wheel rim to a separate location reducing time for assembly of the wheel rims.

Another advantage of the present invention is to provide for an improved design of the robotic device that is not extremely complicated, like prior art designs, and is quite practicable, particularly when processing a variety of wheel sizes and valve stem designs.

Accordingly, the valve stem installation system, shown in the present invention is new, efficient, and provides for an effective way for selectively mounting the valve stems of various configurations into the respective wheel rim at a high speed thereby offering the flexibility needed in modern manufacturing environments.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
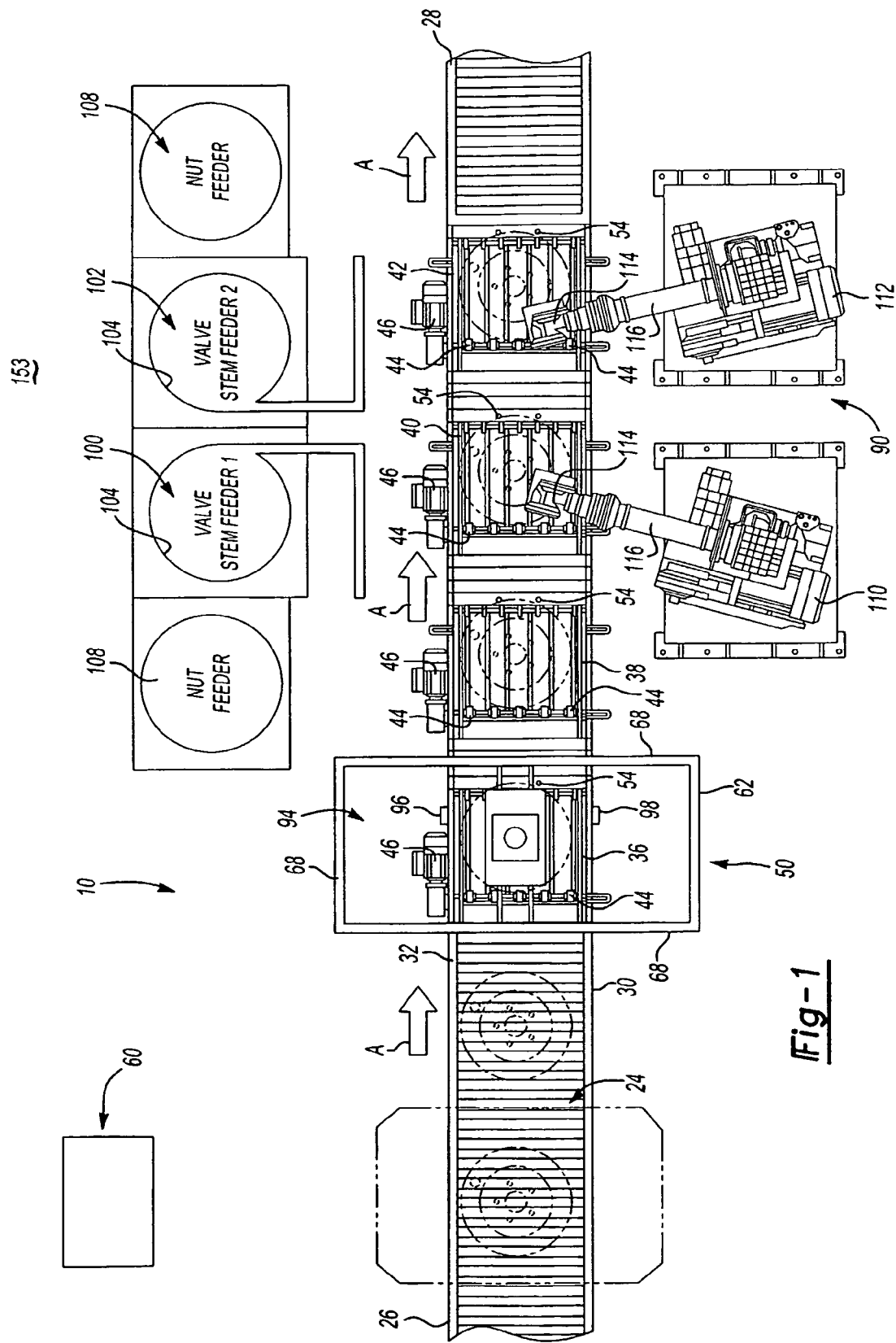
FIG. 1 is an elevational view of a valve stem installation system of the present invention.
Figure 2:
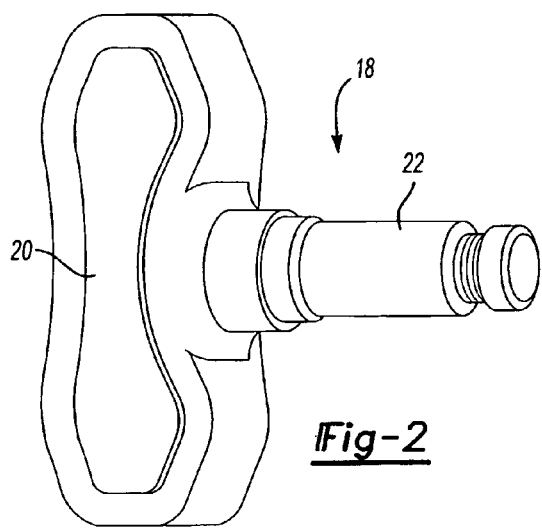
FIG. 2 is a front view of a tire pressure monitoring (TMP) type of a valve stem.
Figure 3:
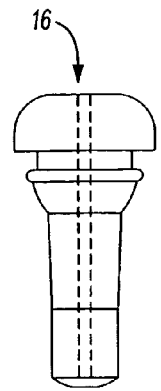
FIG. 3 is a front view of a front view of a regular "snap-in" type of a valve stem.
Figure 6:
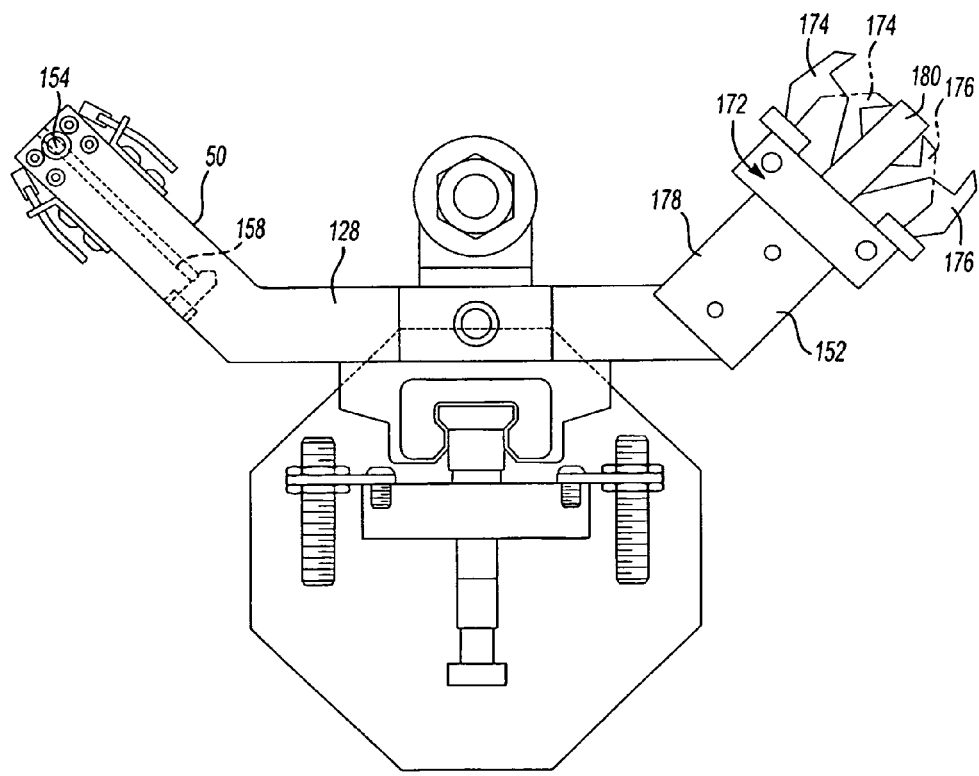
FIG. 6 is a cross sectional view of an inserting tool having a first inserting device for engaging and inserting the "snap-in" type valve stem into the wheel rim and a second inserting device having clamping mechanism for engaging and inserting the TPM into the wheel rim.
Figure 4:
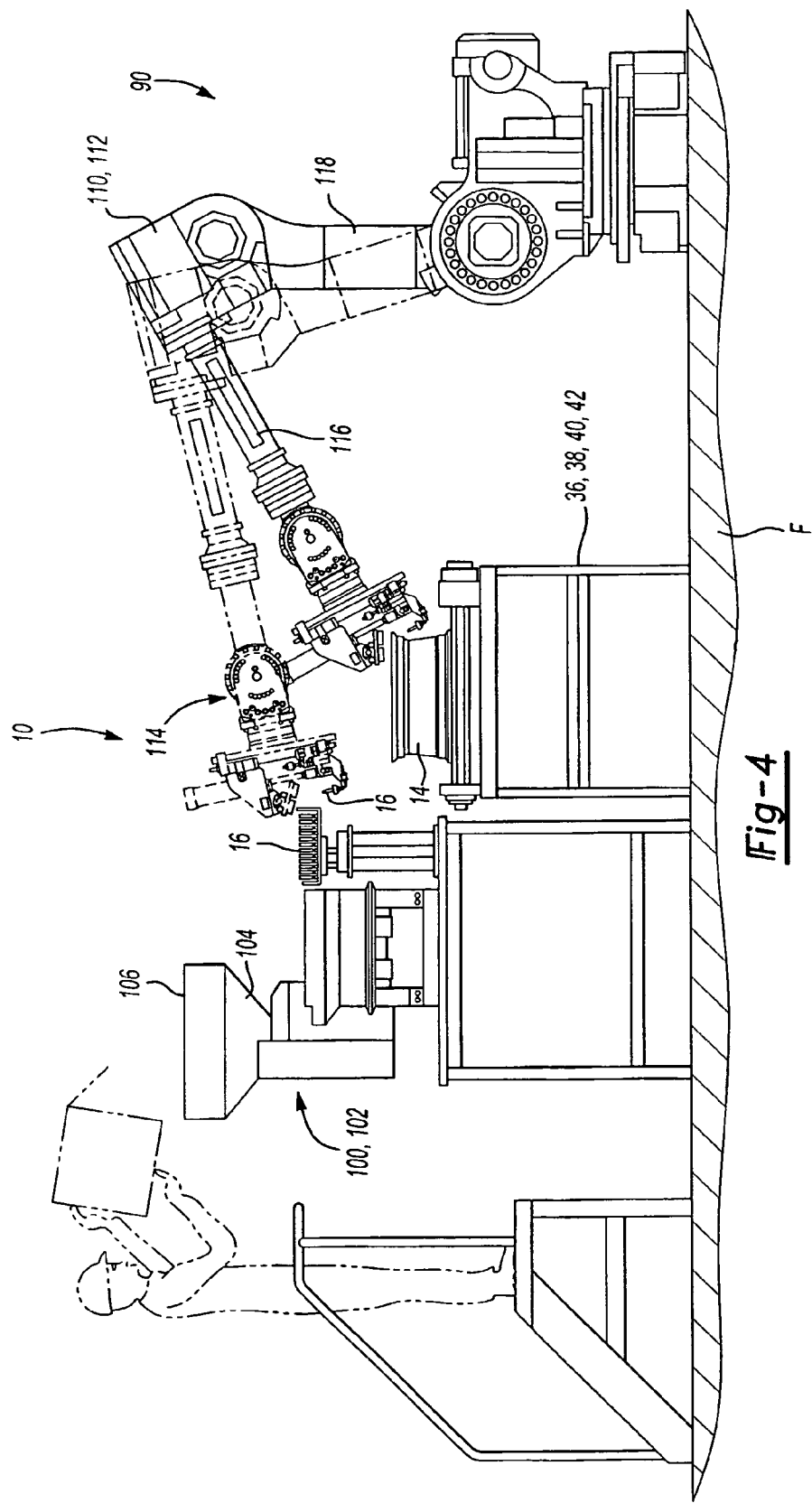
FIG. 4 is another side view of the valve stem installation system illustrating a robotic device receiving a valve stem, shown in phantom, and inserting the valve stem into a wheel rim.

Referring to FIGS. 1 through 3, a valve stem installation system (the system) is generally shown at 10. The system 10 is adaptable to insert an individual valve stem chosen from among a plurality of differently configured valve steins into an aperture 12 defined in a wheel rim 14. These valve stems include and are not limited to a tire pressure monitoring device type of a valve stem (the TPM), generally shown at 18 in FIG. 2, and a standard rubber valve stem (the valve stem), generally shown at 16 in FIG. 3. The valve stem 16 is inserted in the aperture 12 as the wheel rim 14 is moved along an assembly path, generally indicated by an arrow A. The valve stem 16 includes a valve core (not shown) to selectively communicate air to the tire supported by the wheel rim 14 as known to those skilled in the art. The TPM 18 includes a pressure sensor 20 for monitoring the pressure in a tire mounted to the wheel rim 14 and transmits a signal corresponding to the sensed pressure. The TPM 18 is affixed to the wheel rim 14 by a nut 22 disposed upon an opposite side of the wheel rim 14 from the pressure sensor 20. The system 10 is adaptable to insert any types of a valve stems other than the TPM 18 and the standard valve stem 16 and any modifications thereof.

The system 10 includes a conveyance device, generally indicated at 24, for moving the wheel rims 14 of different sizes. The conveyance device 24 includes first 26 and second 28 ends and side walls 30, 32. A plurality of modules 36, 38, 40, 42 are aligned with respect to one another along the assembly path A of the conveyance device 24. The conveyance device 24 is lengthened or shortened by increasing or decreasing, respectively, the number of modules 36, 38, 40, 42. Alternatively, the conveyance device 24 is formed from a single module, such as an endless conveyor loop (not shown). As best shown in FIG. 1, each module 36, 38, 40, 42 includes a plurality of rollers 44 rotatable about the axis. Those skilled in the mechanical art will appreciate that other conveyance devices may be used for moving the wheel rims 14 between the first end 26 and the second end 28. The rollers 44 support the wheel rims 14 during movement along the assembly path A. Each of the modules 36, 38, 40, 42 also includes a motor 46, respectively, mechanically engaged with the rollers 44 to rotate the rollers 44 around the axis. The rollers 44 and the respective motors 46 are operably associated with respect to one another by appropriate gearing, sprockets and chains, or pulleys and belts, generally indicated at 48. Those skilled in the mechanical art will appreciate that other mechanical engagements are used to associate each of the motors 46 with respective rollers 44. Each of the separate modules 36, 38, 40, 42 is disposed at a separate work station disposed along the conveyance device 24. The invention includes various associations of the modules 36, 38, 40, 42 in relation to the conveyance device 24. For example, one of the modules 36, 38, 40, 42 is disposed at an identification station or detector, generally shown at 50 and discussed in great details as the description of the system 10 proceeds. Alternatively, a single module (not shown) extends between two workstations.

Each module 36, 38, 40, 42 includes a stopping device, generally indicated at 52, for preventing the wheel rim 14 from moving along the assembly path A. Each stopping device 52 includes pins 54 movable between an extended position and a retracted position. In the extended position, the pins 54 extend above the rollers 44 associated with corresponding module 36, 38, 40, 42 and prevent the wheel rim 14 from moving along the assembly path A. In the retracted position, the pins 54 are disposed beneath the rollers 44 and the wheel rim 14 moves along the assembly path A. In the exemplary embodiment, the pins 54 are moved between the extended position and the retracted position by an actuator 56. The actuator 56 is connected to a source of fluid supply (not shown). Preferably, the actuator 56 is "LP" type "Parker Air Cylinder". Those skilled in the art will appreciate that other actuators may be used to move the pins 54 between the extended position and the retracted position.

A controller system, generally shown at 60, controls the individual movement of each of the pins 54 associated with the stopping devices 52 between the extended position and the retracted position. The controller system 60 will be discussed in greater detail as the description of the system 10 proceeds. The conveyance device 24 moves the wheel rims 14 along the assembly path A from the beginning to the identification station 50. The location and orientation of the aperture 12 defined by the wheel rim 14 is identified at the identification station 50.

Figure 5:
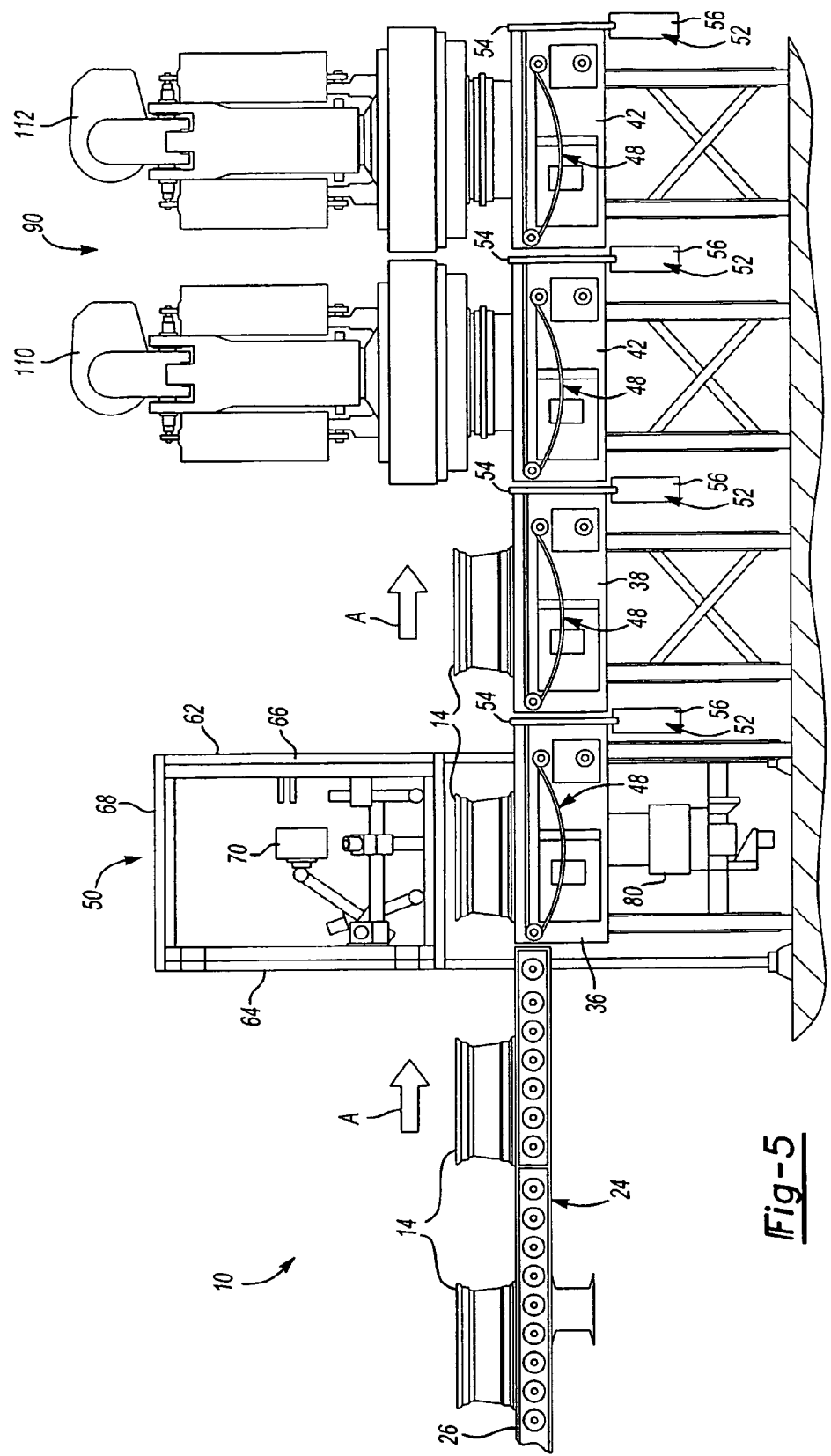
FIG. 5 is a partial side view of the valve stem installation system shown in FIG. 1.

As best shown in FIG. 5, the identification station 50 of the present invention includes a frame 62 extending upwardly from a floor F. The frame 62 is further defined by a plurality of vertical posts 64, 66 interconnected by vertical beams 68 at the respective tops. A camera 70 is supported by the vertical beam 68 and is positioned centrally between the vertical posts 64, 66 to scan the wheel rim 14 to determine a size, angle, and location of aperture 12 defined within an edge of the wheel rim 14. The information about the size, angle, and location of the aperture 12 is further transmitted to the controller system 60. The wheel rim 14 is scanned by the camera 70 and the scanned image of the wheel rim 14 is communicated to the controller system 60. The identification station 50 also includes one or more lights (not shown) to enhance the quality of the scanned image. The scanned image of the wheel rim 14 includes structural features of the wheel rim 14 including the then-current location of the aperture 12.

The identification station 50 of the exemplary embodiment of the invention also includes a positioning device, generally shown at 80, disposed below the rollers 44 associated with the module 36. The positioning device 80 engages the wheel rim 14 at the identification station 50 and raises the wheel rim 14 from the rollers 44, toward the camera 70. The positioning device 80 rotates the wheel rim 14 after the location of the aperture 12 has been identified to a preferred position. For example, the positioning device 80 positions the aperture 12 to reduce the complexity of moving operations of a robotic device, generally shown at 90, disposed at a valve stem inserting station (to be described in greater detail below) downstream of the identification station 50.

Alternatively, the identification station 50 also includes a light curtain, generally shown at 94 including a beam emitting array 96 and a beam receiving array 98. The beam emitting array includes a plurality of individual beam emitters axially spaced along a first support structure and the beam receiving array includes a plurality of individual beam receivers axially spaced along a second support structure (both not shown). Corresponding emitters and receivers communicate with one another to sense the height of the wheel rim 14 disposed at one of the module 36. The light curtain 94 enhances the identification of the wheel rim 14 from among a plurality of differently configured wheel rims 14 by cooperating with the positioning device 80. For example, the positioning device 80 engages a surface of the wheel rim 14 when the positioning device 80 lifts the wheel rim 14 toward the camera 70. Alternatively, the positioning device 80 includes a sensor (not shown) to sense the amount of extension of the positioning device 80. Concurrently, the beam emitting array 96 and the beam receiving array 98 communicate with one another to sense a top surface and a bottom surface of the wheel rim 14. The controller system 60 is adapted to receive signals from the sensor associated with the positioning device 80 and with the light curtain 94 and sense when the wheel rim 14 is moved by the positioning device 80. Specifically, the controller system 60 identifies the amount of extension of the positioning device 80 that corresponds to movement of the wheel rim 14, movement of the wheel rim 14 sensed by the light curtain 92. This axial distance may further enhance the identification of the wheel rim 14 from the plurality of differently configured wheel rims 14.

Preferably, the controller system 60 includes a controller device, i.e. computer, operably and electronically communicated with the identification station 50 and the robotic device 90. The computer has an input/output interface, a central processor unit, a random access memory, i.e. RAM, and a read only memory, i.e. ROM. The input interface is electrically connected with the robotic device 90 and the identification station 50. The controller is pre-programmed with the various tire wheel rim 14 size and types of the valve stem 16 or the TPM 18 to be engaged in the aperture 12. The ROM stores a program, i.e. a comparative software that determines proper mating order and mating engagement between the particular wheel rim 11 and the valve stem 16 or the TPM 18. The controller engages the motor 46 to rotate the rollers 44 associated with the modules 36, 38, 40, 42 and concurrently disengage the motor 56. The controller system 60 compares the image received from the camera 70 with a plurality of images stored in memory and identifies the particular configuration of the wheel rim 14. The scanned images stored in the memory of the controller correspond to all of the differently configured wheel rims 14 that pass through the identification station 50. Each of the images stored in memory is associated with structural characteristics and physical dimensions of a corresponding wheel rim 14 including the orientation of the aperture 12.

Figure 10:
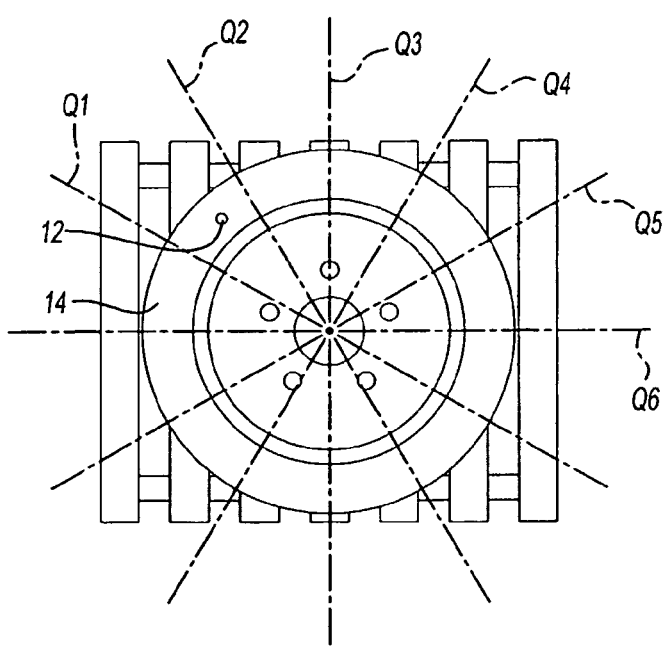
FIG. 10 is a partial and elevational view of the conveyance, device supporting the wheel rim shown as divided into a plurality of quadrants by boundary lines shown in phantom.

As will be set forth more fully below, the controller system 60 controls processing steps performed downstream of the identification station 50 based, at least in part, on the physical dimensions of the wheel rim 14 identified from the scanned image received from the camera 70. As best shown in FIG. 10, the controller system 60 divides the scanned image into a plurality of quadrants Q1 through Q6 and locates the aperture 12 with respect to the particular quadrant Q1 through Q6 that defines the aperture 12. For example, the aperture 12 is defined by the quadrant Q1. Preferably, the controller system 60 divides the wheel rim 14 with as many boundary lines as possible to define as many quadrants as possible. The greater the number of quadrants, the more accurate the initial locating of the aperture 12 will be. The controller system 60 moves pairs of the wheel rims 14 concurrently along the assembly path A between the identification station 50 and the valve stem insertion station. For example, a first wheel rim 14 is moved to the module 36 from the identification station 50 and maintained at the module 36 until a second wheel rim 14 is received by the identification station 50 and the aperture 12 defined by the second wheel rim 14 has been identified with respect to location and orientation. After the wheel rim 14 at the identification station 50 has been processed, both of the wheel rims 14 individually disposed at the module 36 and at the module 38 are moved concurrently along the assembly path A. The wheel rim 14 formerly at the module 36 is moved to the module 38 and the wheel rim 14 formerly at the identification station 50 is moved to the module 36.

Referring again to FIG. 1, two stem feeders, generally indicated at 100 and 102, respectively, are included to deliver different sizes and shapes of the valve stems 16 and the TPM 18. The stem feeders 100 and 102 are positioned adjacent the conveyance device 24. Each stem feeder 100 and 102 stores one of the TPM 18 or the regular rubber valve stem 16. Each stem feeder 100 and 102 includes a hopper 104 that receives the valve stems 16 or the TPM 18. A bowl 106 receives the valve stem 16 or the TPM 18 from the hopper 104. The bowl 106 is rotated about its axis thereby by creating a centrifugal force that aligns and orients each of the valve stems 16 or the TPM 18 in to a single track escapement. The valve stems 16 or the TPM 18 are delivered by the centrifugal force into a stem pick-up port to be accessible by the robotic device 90. The bowl 106 stops rotating automatically when the stem pick-up port is full with the valve stems 16 or the TPM 18, and is turned on automatically, when the valve stems 16 or the TPM 18 in the stem pick-up port are required thereby preventing unnecessary damage to the valve stems 16 or the TPM 18 and loose valve stems 16 or the TPM 18. At least one nut feeder 108 is positioned adjacent one of the stem feeder 100 or 102 that contains the TPM 18.

Referring again to FIG. 1, the robotic device 90 includes at least two robots 110 and 112 adjacent one another and adaptable for multi-axial movement relative to the wheel rim 14 and the conveyance device 24. Each of the robots 110 or 112 is controlled by the controller system 60 to insert valve stems 16 or the TPM 18 in the wheel rims 14 disposed at the modules 36, 38, 40, 42, respectively. The robots 110 and 112 will be described in greater detail immediately below and the robot 110 is structured similarly and functions similarly with respect to the robot 112. The robot 110 includes an insertion tool, generally shown at 114 in FIGS. 7 and 8, and a robot arm 116 pivotably engaged within a base support portion 118 defining an elbow joint therebetween. The robot arm 116 moves the insertion tool 114 into position to insert any of the valve stems 16 or the TPM J8 in the aperture 12 defined by the wheel rim 14.

Figure 7:
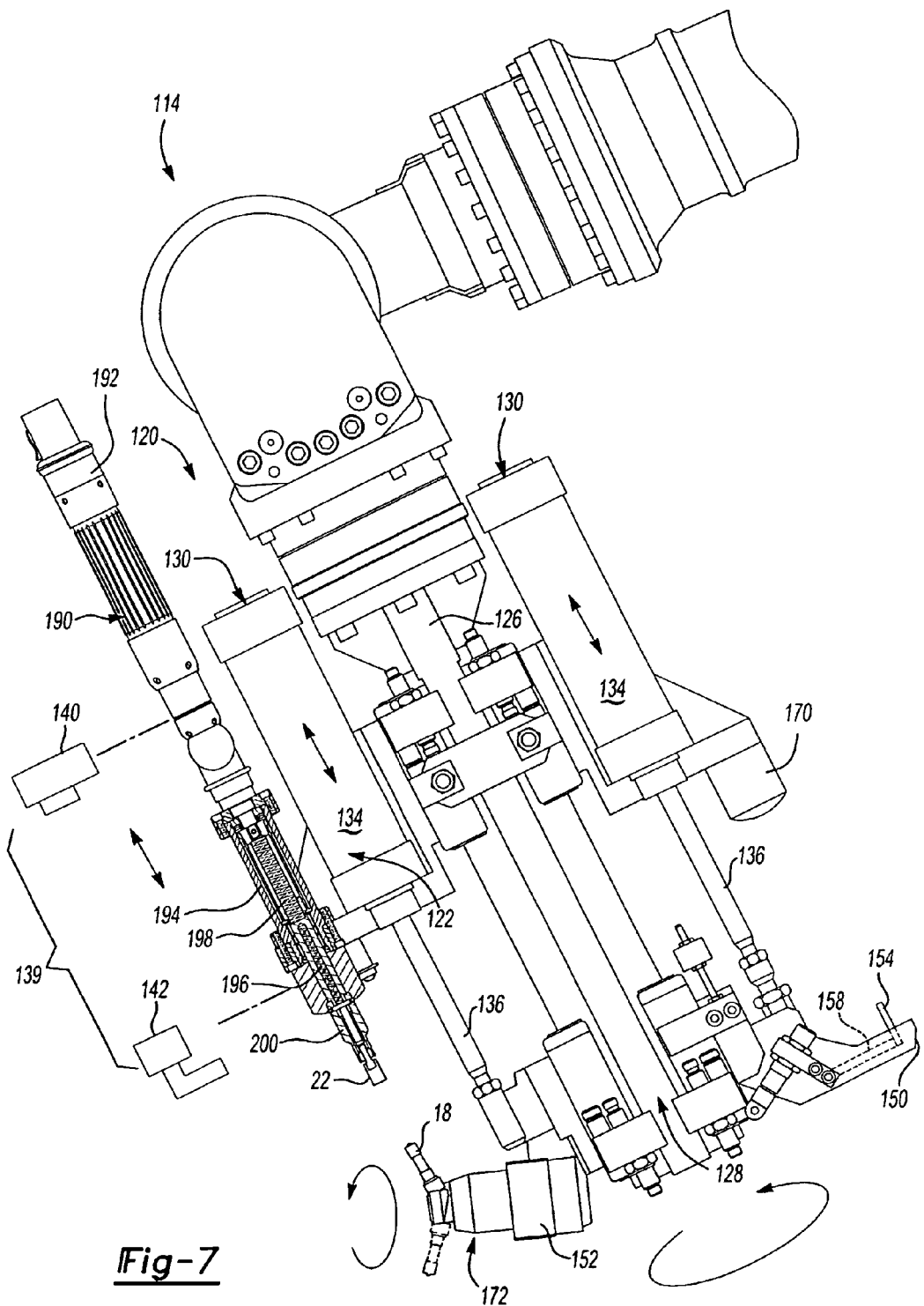
FIG. 7 is a partial cross sectional view of the inserting tool for engaging various types of the valve stem and operably connected to a robot arm of the robotic device adaptable for multi-axial movement.
Figure 8:
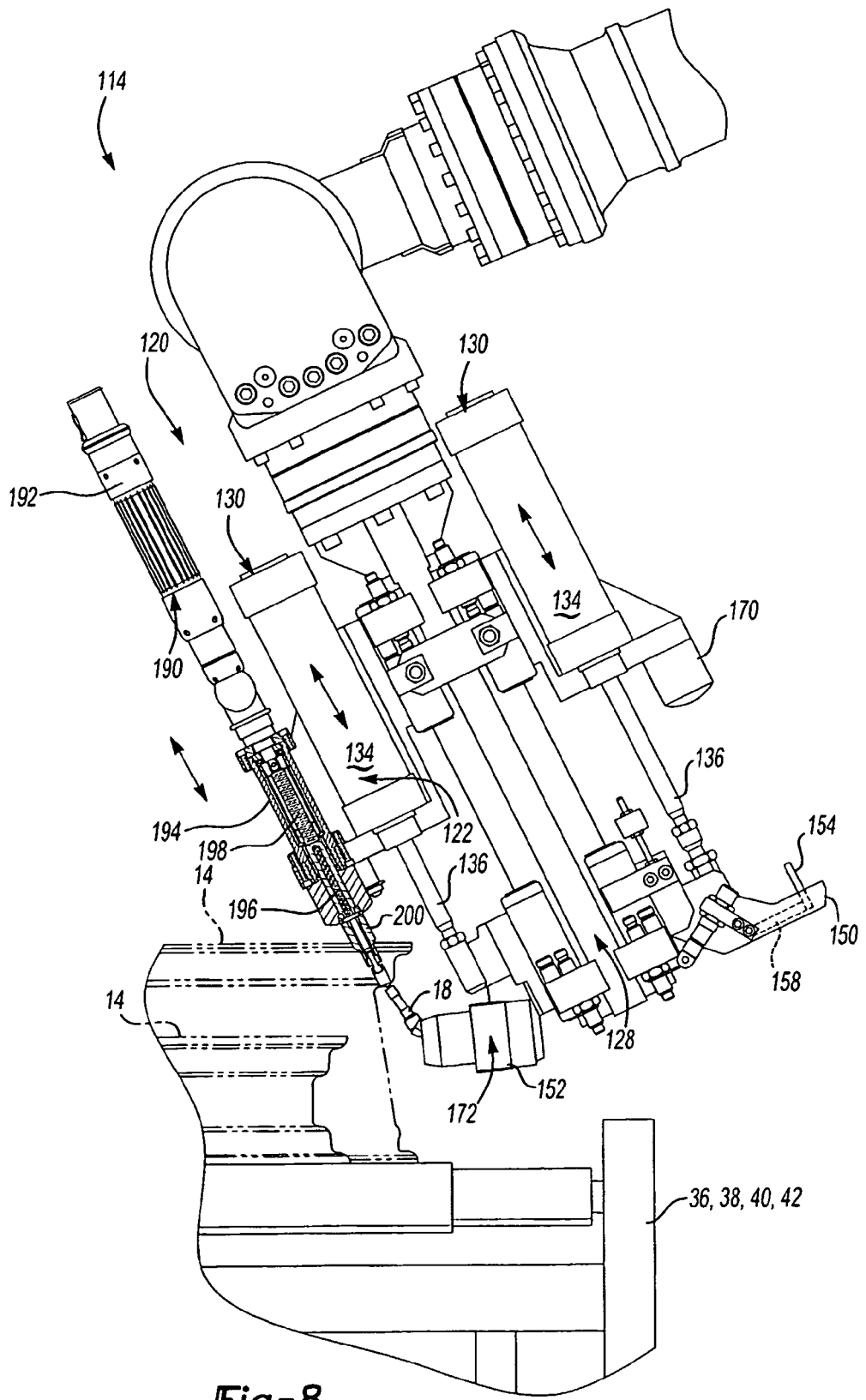
FIG. 8 is another fragmental and partially cross sectional view of the inserting tool shown in FIG. 7 illustrating the inserting tool assembling the valve stem with the wheel rim shown in phantom.
Figure 9:
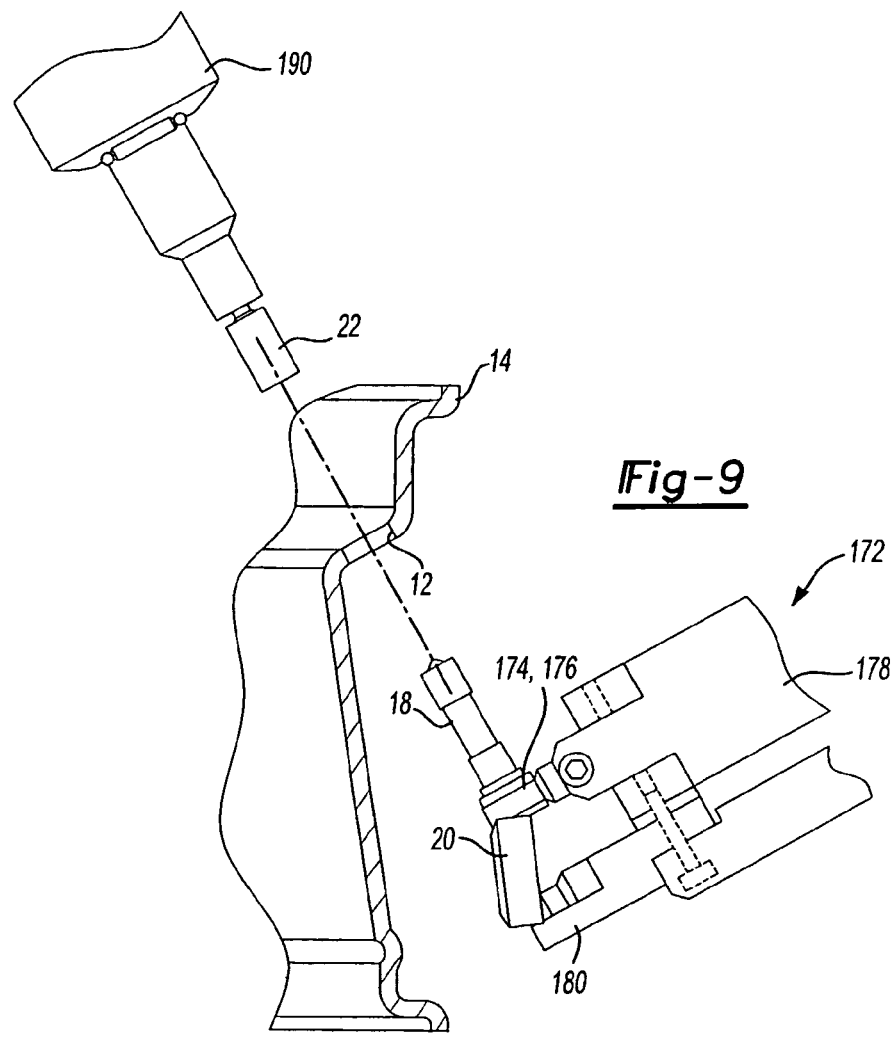
FIG. 9 is a partial side view of the second inserting device cooperable with a nut runner and positioned relative to the wheel rim.

Referring to FIGS. 7 through 9, the insertion tool 114 includes a slide assembly, generally shown at 120. The slide assembly 120 includes a first portion, generally indicated at 122, slidably connected to a stationary member 126 associated with the robot arm 116. The slide assembly 120 also includes a second portion, generally indicated at 128, slidably associated with the first portion 122. The sliding engagement between the first portion 122 and the second portion 128 enhances the insertion of valve stems 16 or the TPM 18 by reducing the likelihood that the insertion tool 114 may move the wheel rim 14 during insertion of the valve stem 16 or the TPM 18 by clamping the wheel rim 14 in between. A second moving device, generally indicated at 130, is supported by the first portion 122. The second moving device 130 is connected to both of the first 122 and second 128 portions to slide the first 122 and second 128 portions relative to one another. In the exemplary embodiment of the invention, the second moving device 130 includes a cylinder 134 and a rod 136. The rod 136 extends and retracts with respect to the cylinder 134. When the rod 136 contracts to insert the valve stem 16, the first 122 and second 128 portions move closer to one another. When the rod 136 is in its extended position, the first 122 and second 128 portions move away from one another. The aperture 12 defined by the wheel rim 14 is disposed between the first 122 and second 128 portions when the valve stem 16 is inserted. The insertion tool 114 also includes an aperture locating device or locator, generally shown at 139. The locator 139 includes an aperture locating camera 140 associated with the first portion 122 and a back light 142 associated with the second portion 128. The locator 139 is designed for identifying the location of the aperture 12 relative to a radial zone defined by the wheel rim 14 at the identification tower 50 to thereby signal the insertion tool 114 the radial zone the aperture 12 to align the radial zone identified in identification tower 50 with one of the valve stem 16 or the TPM 18 as the insertion tool 114 interchangeably moves and inserts one of the valve stem 16 and the TPM 18 into the aperture 12. The aperture-locator and its functional and mechanical aspects are fully described in the patent application Ser. No. 10/846,823 assigned to the assignee of the present invention and is incorporated herewith by reference in its entirety.

When the wheel rim 14 moves to the module 38, the rod 136 extends from the cylinder 134, moving the first 122 and second 128 portions away from one another. Also, the robot arm 116 positions the insertion tool 114 such that a periphery of the wheel rim 14 is disposed between the first 122 and second 128 portions and between the aperture locating camera 140 and the back light 142. The robot arm 116 moves the insertion tool 114 the around the periphery of the wheel rim 14 until the camera 140 and the back light 142 communicate with one another, which corresponds to the location of the aperture 12. After the aperture 12 has been located by the aperture locator, the robot arm 116 moves the insertion tool 114 to position one of a plurality of insertion devices adjacent the aperture 12. For example, the second portion 128 supports at least two insertion devices 150 and 152 spaced from one another. In the exemplary embodiment, the second portion 128 is generally U-shaped and supports the individual first and second insertion devices 150 and 152 at opposing distal ends of the U-shaped second portion 128. Each of the first and second insertion devices 150 and 152 are configured to insert a differently configured valve stem, such as the valve stem 16 and the TPM 18. Preferably, the first insertion device 150 supports the standard valve stems 16 for insertion in the aperture 12 and the second insertion device 152 supports the TPM 18 for insertion in the aperture 12.

After the aperture 12 has been located by the locator, the controller system 60 controls the robot arm 116 to move the insertion tool 114 and position the appropriate insertion device 150 or 152 adjacent the aperture 12. The determination of which of the valve stem 16 or the TPM 18 to insert in the aperture 12 is made by the controller system 60 in response to the image of the wheel rim 14 scanned by the camera 70 at the identification station 50 and to the data corresponding to the scanned image that is stored in the memory of the controller system 60. Prior to insertion of the valve stem 16 or the TPM 18 with respect to the aperture 12, the robot arm 116 moves the insertion tool 114 to a valve stem loading station 153 to receive the valve stem 16 or the TPM 18. For example, the first insertion device 150 includes a pin 154 insertable in the valve stem 16 to secure the valve stem 16 for installation. The robot arm 116 moves the insertion tool 114 to insert the pin 154 in the valve stem 16 disposed at the valve stem loading station and then moves the valve stem 16, received by the pin 154, to the wheel rim 14 disposed at the module 38. The first insertion device 150 also includes a vacuum device (not shown) creating a vacuum in a vacuum line 158 communicating with an outer surface 160 of the pin 154. After the pin 154 has been inserted in the valve stem 16 at the valve stem loading station 153, the vacuum device applies a vacuum through the vacuum line 158 to prevent the valve stem 16 from being separated from the pin 154. The pin 154 also includes one or more vacuum sensors (not shown) communicating with the controller system 60 so that, if the valve stem 16 becomes disengaged with respect to the pin 154, the controller system 60 emits an error signal to an operator. The vacuum defined in the vacuum line 158 also aligns the valve stem 16 with the pin 154. After the pin 154 has received the valve stem 16, the robot arm 116 moves the insertion tool 114 to align the pin 154 with the aperture 12 defined by the wheel rim 14. The rod 136 is then retracted with respect to the cylinder 134 and the first portion 122 and the second portion 128 move closer to one another. The insertion tool 114 may also include a support member 170 associated with the first portion 122. The support member 170 is operably connected to another moving device 130 that includes the cylinder 134 and the rod 136. The support member 170 is aligned with the pin 154 such that the support member 170 engages the surface of the wheel rim 14 when the valve stern 16 is being inserted in the aperture 12.

If the wheel rim 14 is adapted to receive the TPM 18, the robot arm 116 moves the insertion tool 114 to position the insertion tool 114 adjacent the valve stem loading station 153 to receive the TPM 18. The insertion tool 114 includes a pinching device, generally shown at 172 in FIG. 9. The pinching device 172 has a first arm or finger 174 and a second arm or finger 176. The first and second arms 174, 176 are pivotally associated with the second portion 128 to rotate closer to one another and engage the TPM 18 by its neck or sides. The pinching device 172 includes an actuator 178 connected to the second portion 128 to pivot the first and second arms 174, 176 relative to one another. A pinching link 180 is operably connected to the first and second arms 174, 176 and slidably movable in a direction different than the first and second arms 174, 176 for supporting the TPM 18 at another angle, such as a bottom of the TPM 18, and pinching the TPM 18 into the aperture 12. After the TPM 18 has been engaged by the pinching device 172, the robot arm 116 moves the insertion tool 114 from the valve stem loading station 153 to the wheel rim 14. The robot arm 116 positions the TPM 18 adjacent the aperture 12 and the rod 136 retracts with respect to the cylinder 134, moving the first portion 122 and the second portion 128 closer to one another. The insertion tool 114 of each robot 110 or 112 is adaptable for selectively engaging one of the valve stem 16 and the TPM IS and interchangeably moving and inserting one of the valve stem 16 and the TPM 18 into the aperture 12 in response to a signal received by the robot 110 or 112 from the controller.

The insertion tool 114 also includes a nut runner, generally indicated at 190 and associated with the first portion 122. The nut runner 190 has a housing 192 and an actuator (not shown) disposed in the housing 192. The actuator is operatively connected to a drive assembly 194 having a driving rod 196 and a resilient member 198 circumscribing the driving rod 196. A nut retaining tip 200 is cooperable with the drive assembly to engage the nut 22. The nut runner 190 includes a cartridge (not shown) connected to the nut feeder 108 to supply the nut runner 190 with the nuts 22. Alternatively, the nut runner 190 includes other mechanical devices adaptable for securing the nut 22 to the TPM 18. The particular design of the nut runner 190 as disclosed in the present application is not intended to limit the present invention. After the TPM 18 has been inserted in the aperture 12, the nut runner assembles the nut 22 to the TPM 18 to fixedly connect the TPM 18 with respect to the wheel rim 14. As set forth above, the present invention provides an improved apparatus and method for inserting the valve stem 16 and the TPM 18 with respect to wheel rims 14.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for selectively mating one of a valve stem and a pressure monitoring device (TPM) and assembling one of the valve stem and the TPM with a wheel rim having an aperture formed therein for receiving one of the valve stem and the TPM, said system comprising:
   a detector for identifying a configuration of the wheel rim;
   a robotic device having an insertion tool configured to install both the TPM and the valve stem and being adaptable for moving one of the valve stem and the TPM from a feeder to the wheel rim for mating one of the valve stem and the TPM to the wheel rim;
   a controller operably communicated with said robotic device and said detector for receiving a signal from said detector and transmitting said signal to said robotic device thereby directing said robotic device to selectively engage one of the valve stem and the TPM; and
   said insertion tool of said robotic device selectively engaging one of the valve stem or clamping the TPM as directed by said controller for inserting one of the valve stem the TPM into the aperture in response to said signal received by said robotic device from said controller.

2. A system as set forth in claim 1 wherein said robotic device is further defined by a pair of robots adjacent one and the other with each of said robots including a robot arm connected to a shoulder and multi-axially movable relative to one another and relative to the wheel rim.

3. A system as set forth in claim 2 wherein said insertion tool is operably connected to said robot arm.

4. A system as set forth in claim 3 wherein said insertion tool is further defined by a first inserting device and a second inserting device.

5. A system as set forth in claim 4 wherein said second inserting device is further defined by a pair of fingers pivotably movable towards one another for engaging the TPM at a first angle.

6. A system as set forth in claim 5 wherein said second inserting device includes a pinching link cooperable with said fingers and slidably movable in a direction different than pivotable direction of said fingers for supporting the TPM at a second angle thereby pinching the TPM into the aperture.

7. A system as set forth in claim 6 wherein said second inserting device includes an actuator to facilitate pivotable motion of said fingers and slidable motion of said pinching link relative to one another for engaging and disengaging the TPM.

8. A system as set forth in claim 7 wherein said second inserting device includes a nut runner associated with and slidably movable relative to said second inserting device for assembling a nut with the TPM.

9. A system as set forth in claim 4 wherein said first inserting device is further defined by a pin and a vacuum device fluidly communicated with said pin for engaging the valve stem with said pin, said vacuum device applying vacuum to said pin thereby preventing said pin from disengaging from the valve stem.

10. A system as set forth in claim 9 wherein said first inserting device includes at least one vacuum sensor communicating with said controller for controlling frictional engagement between said pin and the valve stem.

11. A system as set forth in claim 1 including a conveyance device for moving the wheel rims relative to said robotic device.

12. A system as set forth in claim 11 wherein said conveyance device is further defined by a plurality of modules aligned with respect to one another along said conveyance device.

13. A system as set forth in claim 12 wherein each of said modules includes a stopping device for preventing the wheel rim from moving along said conveyance device, said stopping device having at least one pin movable between an extended position and a retracted position for preventing the wheel rim from moving along said conveyance device.

14. A system for selectively mating one of a valve stem and a pressure monitoring device (TPM) and assembling one of the valve stem and the TPM with a wheel rim having an aperture formed therein for receiving one of the valve stem and the TPM, said system comprising:
    a robotic manipulator having an insertion tool, said insertion tool being capable of clasping either a valve stem or a TPM and being movable to a valve stem feeder and a TPM feeder thereby selectively clasping one of the valve stem and the TPM and moving one of the valve stem and the TPM from the valve stem feeder or the TPM feeder to the wheel rim;
    said insertion tool having a first opposing member and a second opposing member with said first opposing member being for receiving and securing the valve stem and said second opposing member having cooperating fingers being movable for clamping the TPM; and
    said robotic manipulator being programmable to selectively and interchangeably moving either the valve stem or the TPM to the wheel rim and mating valve stem or the TPM with the wheel rim.

15. A system as set forth in claim 14 wherein said robotic manipulator includes a robot arm connected to a shoulder multi-axially movable relative to one another and relative to the wheel rim.

16. A system as set forth in claim 15 wherein said first opposing member is further defined by a pin and a vacuum device fluidly communicated with said pin for engaging the valve stem with said pin.

17. A system as set forth in claim 16 wherein said pair of fingers of said second opposing member are pivotably movable towards one another for engaging the TPM at a first angle.

18. A system as set forth in claim 17 wherein said second opposing member includes a pinching link slidably movable in a direction different than said pair of fingers for supporting the TPM at a second angle and pinching the TPM into the aperture.

19. A system as set forth in claim 18 including a conveyance device for moving the wheel rims relative to said robotic manipulator and a plurality of modules aligned with respect to one another along said conveyance device.

20. A system for selectively engaging a valve stem and a pressure monitoring device (TPM) and assembling one of the valve stem and the TPM with a wheel rim having an aperture formed therein for receiving one of the valve stem and the TPM, said system comprising:
    a detector for identifying the wheel rim and locating a radial zone;
    a robotic device adaptable for detecting a location of the aperture in the wheel rim and matably moving one of the valve stem and the TPM to the wheel rim;
    a controller operably communicated with said robotic device and said detector for receiving a signal from said detector as said detector identifies configuration of the wheel rim and transmitting said signal to said robotic device thereby directing said robotic device to selectively engage one of the valve stem and the TPM;
    an insertion tool of said robotic device adaptable for selectively engaging the valve stem and clamping the TPM and moving the valve stem or the TPM from a feeder to the wheel in response to said signal received by said robotic device from said controller; and
    a locating device connected to said insertion tool for identifying a precise location of the aperture relative to the radial zone for signaling said insertion tool the precise location of the aperture enabling said insertion tool to interchangeably move and insert one of the valve stem and the TPM into the aperture.

21. A system as set forth in claim 20 wherein said locating device includes light emitters and light receivers corresponding to said light emitters for identifying the location of the aperture relative to the radial zone defined by the wheel rim.

22. A system as set forth in claim 21 wherein said robotic device is further defined by a pair of robots adjacent one and the other with each of said robots including a robot arm connected to a shoulder multi-axially movable relative to one another and relative to the wheel rim.

23. A system as set forth in claim 22 wherein said insertion tool is further defined by a first inserting device and a second inserting device.

24. A system as set forth in claim 23 including a nut runner associated with and slidably movable relative to said insertion tool for assembling a nut with the TPM thereby securing the TMP with the wheel rim.

25. A system as set forth in claim 24 wherein said first inserting device is further defined by a pin and a vacuum device fluidly communicated with said pin for engaging the valve stem with said pin with said vacuum device applying vacuum to said pin thereby preventing said pin from disengaging from the valve stem.

26. A system as set forth in claim 25 wherein said second inserting device is further defined by a pair of fingers pivotably movable towards one another for engaging the TPM at a first angle and a pinching link cooperable with said fingers and slidably movable in a direction different than pivotable direction of said fingers for supporting the TPM at a second angle thereby pinching the TPM into the aperture.

27. A system as set forth in claim 20 including a conveyance device for moving the wheel rims relative to said robotic device with said conveyance device including a plurality of modules aligned with respect to one another along said conveyance device, each of said modules including rollers for supporting and moving the wheel rims along said conveyance device.

28. A method of selectively mating one of a valve stem and a pressure monitoring device (TPM) and assembling one of the valve stem and the TPM a wheel rim having an aperture defined therein, said method comprising the steps of:
    identifying type of the wheel rim thereby determining if the wheel rim requires a valve stem or a TPM;
    identifying a location of the aperture defined by the wheel rim;
    rotating a robotic device relative to the wheel rim and matably moving one of the valve stem and the TPM to the wheel rim;
    associating a controller with the robotic device to receive a signal as the size of the wheel rim is identified and transmitting the signal to the robotic device to direct the robotic device to selectively engage one of the valve stem and the TPM; and selectively engaging the valve stem and the TPM by clamping the TPM as directed by the controller;

interchangeably moving and inserting one of the valve stem and the TPM into the aperture in response to the signal received by the robotic device from the controller.

29. A method as set forth in claim 28 wherein the step of positioning of the robotic device is further defined by positioning a pair of robots adjacent one and the other with each of the robots including a shoulder and a robot arm multi-axially movable relative to one another and relative to the wheel rim.

30. A method as set forth in claim 29 further including the step of providing an insertion tool having a first inserting device a second inserting device.

31. A method as set forth in claim 30 wherein the step of providing the insertion tool is further defined by connecting a pin and a vacuum device fluidly communicated with the first inserting device to engage the valve stem with the pin and applying vacuum through the vacuum device to prevent the pin from disengaging from the valve stem.

32. A method as set forth in claim 31 wherein the step of providing the insertion tool is further defined by pivotably engaging a pair of fingers to a base portion of the second inserting device to engage the TPM at one angle.

33. A method as set forth in claim 32 wherein the step of connecting the inserting tool is further defined by connecting a pinching link to the base portion to move the pinching link in a direction different than direction of pivotable movement of the fingers to support the TPM at another angle and to pinch the TPM into the aperture.

34. A method as set forth in claim 33 including the step of connecting a nut runner to the second inserting device to assemble a nut with the TPM.

* * * * *

UNITED STATES PATENT AND TRADEMARK OFFICE
CERTIFICATE OF CORRECTION

PATENT NO. : 7,647,693 B2  Page 1 of 1
APPLICATION NO. : 11/547341
DATED : January 19, 2010
INVENTOR(S) : Eugene M. Mondrusov et al.

It is certified that error appears in the above-identified patent and that said Letters Patent is hereby corrected as shown below:

At Column 3, Line 41:

Please delete "(TMP)" and add -- (TPM) --.

Claim 24 at Column 12, Line 33:

Please delete "(TMP)" and add -- (TPM) --.

Signed and Sealed this

Thirtieth Day of March, 2010

David J. Kappos
*Director of the United States Patent and Trademark Office*